United States Patent [19]

Band

[11] Patent Number: 4,472,521
[45] Date of Patent: Sep. 18, 1984

[54] SUPPORTED CATALYST FOR POLYMERIZATION OF OLEFINS

[75] Inventor: Elliot I. Band, Yonkers, N.Y.

[73] Assignees: Stauffer Chemical Company, Westport, Conn.; Stauffer Chemical Company, Westport, Conn.

[21] Appl. No.: 451,628

[22] Filed: Dec. 20, 1982

[51] Int. Cl.$^3$ .............................................. C08F 4/64
[52] U.S. Cl. .................................. 502/104; 502/113; 502/118; 502/119; 502/121; 502/122; 502/123; 502/124; 502/125; 502/126; 502/127; 526/114; 526/125
[58] Field of Search ............... 502/104, 113, 118, 127, 502/119, 125, 126, 123, 122, 124, 121

[56] References Cited

U.S. PATENT DOCUMENTS

| | | | |
|---|---|---|---|
| 3,135,809 | 6/1964 | Bosmajian | 502/103 X |
| 3,901,863 | 8/1975 | Berger et al. | 502/113 X |
| 4,039,472 | 8/1977 | Hoff | 502/119 X |
| 4,218,339 | 8/1980 | Zucchini et al. | 502/119 X |
| 4,250,288 | 2/1981 | Lowery et al. | 502/119 X |
| 4,252,670 | 2/1981 | Caunt et al. | 502/127 X |
| 4,329,253 | 5/1982 | Goodall et al. | 502/127 X |
| 4,363,746 | 12/1982 | Capshew | 502/154 |

*Primary Examiner*—Patrick Garvin
*Attorney, Agent, or Firm*—Henry Z. Friedlander; Vivienne T. White; Henry Z. Friedlander

[57] ABSTRACT

An unmilled catalytic component for polymerizing olefins with high activity to yield polymers with high stereoregularity and a narrow particle size distribution with a low weight percentage of small particles comprises a solid, unmilled support containing magnesium-halogen bonds, a transition metal halide of a metal selected from Groups IVB and VB of the periodic table, and electron donors.

This catalytic component is obtained by steps comprising:

(a) contacting a Mg(OR)$_2$ and/or Mn(OR)$_2$ compound with a Ti(OR)$_4$ compound to comprise a liquid, where R is a hydrocarbyl or halogenated hydrocarbyl moiety containing 1 to 20 carbon atoms or a halogen,
(b) reacting the liquid with a fluid comprising a halogenating agent and treatment with an electron donor to form a treated solid, and
(c) post-treating the solid with a transition metal halide.

19 Claims, No Drawings 4,472,521

SUPPORTED CATALYST FOR POLYMERIZATION OF OLEFINS

BACKGROUND OF THE INVENTION

This invention relates to the polymerization of olefins by the coordinate complex method, often termed the Ziegler-Natta method after the names of the two workers who contributed so muct to its practical development and theoretical basis. More particularly, this invention relates to novel, activated supports for the transition metal catalytic component.

About 30 years ago the original Ziegler-Natta catalysts were heterogeneous slurries formed in place when solutions of organometallic cocatalysts, preferably taken from the compounds of metals of Groups IA, IIA, and IIIA of the periodic table, were added to solutions of transitional metal catalysts, preferably taken from compounds of metals of Groups IIIB, IVB, and VB of the periodic table. These catalytic systems by today's standards did not have high activity in terms of grams polyolefins produced per gram catalyst component. Nor, when propylene or other monomers capable of giving polymers with tacticity were employed, did these early catalytic systems provide polymer with high isotactic index. Also, the particle size distribution of the polyolefin was too broad, leading to an undesirable fraction of "fines", particles less than about 100–180 μm.

More recently, high activity, high isotactic index, and enhanced particle size have been achieved by employing catalyst supports on which catalytic transition metals have been dispersed. It has been theorized that the concentration of active polymerization centers is as much as 50 percent higher on supported catalysts than unsupported catalyst systems. These developments are discussed in the Kirk-Othmer "Encyclopedia of Chemical Technology", third edition, vol. 16, pp. 453–469 in an article entitled Olefin Polymers (Polypropylene) and in Angewandte Makromolekulare Chemie, 94, 63–89 (1981). One support which has gained favor in technical circles is magnesium halide, particularly in an activated condition. The preferred method for activating catalyst support such as magnesium halide is dry milling, as disclosed in British Pat. No. 1,335,887.

Dry milling suffers from many practical defects. Among these are long milling regimes, losses of support by "hold-up" in the milling equipment, excessive handling, the cost of milling energy, and a wide dispersion of the particle size of the milled products leading to excessively broad particle size distribution of the polyolefin. It would be advantageous to have the high catalytic activity of a supported catalyst, the high isotacticity of polymers capable of such (e.g., polypropylene) and a decreased proportion of "fines" without the necessity of a milling or grinding step. This is achieved by use of the present invention.

U.S. Pat. No. 4,329,253 discloses procedures for preparing a catalytic component for polymerizing olefins wherein commercial magnesium alkoxides or magnesium alkoxides generated in situ from the metal plus alcohol are treated with an electron donor and titanium tetrachloride (TiCl$_4$) to form a solid, which is always further treated with a halocarbon or halogenated hydrocarbon plus post-treatment with TiCl$_4$.

Japanese patent application No. 80/23,435, published as JP 81/120,711 (C.A. 96:20578e) discloses combining magnesium ethoxide with tetrabutyl titanate in heptane to produce a solid. This solid is then further treated with ethyl benzoate and TiCl$_4$ to yield a catalytic component for polymerizing olefins.

Japanese patent application No. 79/150,026 published as JP 81/74,103 (C.A. 95:133633s) discloses a process for heating magnesium ethoxide with ethanol and TiCl$_4$ to form a solid. This solid is then further treated successively with ethyl benzoate, tetraethyl silicate and TiCl$_4$ to produce a catalytic component.

Japanese patent application No. 80/1,266, published as JP 81/99,207 (C.A. 95:204706f) discloses a process for preparing a catalytic component for polymerizing olefins by refluxing magnesium ethoxide with isopropyl alcohol and silicon tetrachloride to produce a solid. This solid is then successively treated with ethyl benzoate and boiling TiCl$_4$ to yield a catalytic component for polymerizing propylene.

OBJECTS OF THE INVENTION

It is an object of this invention to prepare a supported, active catalytic component for polymerizing olefins, alone or in mixtures, to polymers of high stereo-regularity without employing a milling or grinding step.

Further, it is an object of this invention to prepare a catalytic component which when employed yields polyolefin with a more narrow, and higher distribution of particle size diameter, so that there is a minimal component of "fines" in the polymer.

Other objects of the invention will be apparent to those skilled in the art of polymerization

SUMMARY OF THE INVENTION

Surprisingly, it has been found that an active, stereo-specific, supported catalytic component for coordinate complex (Ziegler-Natta) polymerization of olefins, such as propylene, to give polyolefin with a more narrow and higher particle size distribution, results from a preparative process which keeps the reaction system liquid until the inital contact with a halogenating agent. After reaction with a halogenating agent such as a transition metal or Group III-IV-V halide, a solid support forms.

The novel catalytic component comprises a support containing magnesium halide or manganese halide, a transition metal halide, and at least one electron donor obtained by steps comprising:

(a) contacting a Mg(OR)$_2$ and/or Mn(OR)$_2$ compound with a Ti(OR)$_4$ compound to comprise a liquid, where R is a hydrocarbyl or halogenated hydrocarbyl moiety containing 1 to 20 carbon atoms or a halogen, (b) reacting the liquid with a fluid comprising a halogenating agent such as a halide of Groups III, IV, and V elements and treatment with an electron donor to form a treated solid, and (c) post-treating the solid with a transition metal halide.

Steps (b) and (c) may be combined into one step if the halogenating agent is a transition metal halide, preferably the halide of a Group IVB metal. Treatment with the halogenating agent and the electron donor may be carried out simultaneously or sequentially.

DETAILED DESCRIPTION OF THE INVENTION

The first step (a) in the process for preparing the catalyst of the present invention entails two compounds which are to be contacted and maintained in the liquid state. Often it is advantageous to perform this contacting step in the presence of a solvent/thinner such as hydrocarbon, but use of a solvent/thinner is not crucial to the invention. Likewise, it is advantageous to carry out contacting step (a) at an elevated temperature, but this also is not necessary to the practice of the instant invention.

The first compound is an alkoxide of a Group IIA or VIIB metal, or a partial alkoxide of such. Preferred Group IIA and VIIB metals are magnesium and manganese, but alkoxides or partial alkoxides of beryllium, and rhenium may be employed. By partial alkoxides, it is meant that hydroxyl, halogen, or other substituent groups may be present as long as the alkoxide compound can be solubilized by the liquid. Normally, Group IIA and VIIB alkoxides are solids but liquids may be employed. Magnesium ethoxide, magnesium butoxide, manganese ethoxide, and manganese butoxide are especially preferred Group IIA and VIIB alkoxides.

The liquid compound is chosen on two bases: (1) that it dissolve the alkoxide or partial alkoxide, and (2) that it have a benign influence on the final catalyst component. The preferred liquid compound is a $M(OR)_4$ liquid where M is a metal from Group IV of the periodic table and R is a hydrocarbyl or halogenated hydrocarbyl moiety containing 1 to 20 carbon atoms or a halogen. The preferred Group IV metals are titanium, silicon, and tin. Especially preferred liquid compounds are tetrabutyl titanate, tetraethyl silicate, and tetrabutyl stannate. When the halogenating agent of step (b) is titanium tetrachloride, tetrabutyl titanate is the preferred liquid for dissolving the Group IIA or VIIB alkoxide and keeping it in solution during the first step.

The solvent/thinner which may be present during step (a) functions to lower the viscosity of the solubilized mixture. Aromatic or aliphatic hydrocarbons such as toluene or heptane are preferred solvent/thinners, but care must be taken to use only so much as to lower the viscosity of the mixture without insolubilizing any of it.

The preferred ratio of solubilizing liquid to metal alkoxide by weight ranges from about 2:1 to about 10:1. The preferred ratio of solvent/thinner to metal alkoxide by weight ranges from about 2:1 to about 25:1.

It is advantageous both to contact the metal alkoxide with the solubilizing liquid compound and to add The solvent/thinner to the mixture at an elevated temperature. The mixing may take place at any temperature from about 15° C. to about 180° C. A temperature from about 100° C. to about 150° C. is preferred. It is advantageous to stir the mixture while the liquid is dissolving the alkoxide. The mixing time may vary from about 20 minutes to about six hours with from about one hour to about two hours preferred. It is also advantageous to add the solvent/thinner at an elevated temperature with a temperature from about 60° to about 150° C. preferred.

It is not necessary for the practice of this invention to know what chemical reactions, if any, take place between the normally solid alkoxide and the solubilizing liquid compound. After the solvent/thinner has been added, it is advantageous to filter the thinned, mixed liquid and allow it to cool to ambient temperature before, during, or after filtration.

The next step (b) in the process of producing the novel catalytic component of the present invention is reaction with a halogenating agent and treatment with one or more electron donors (Lewis bases). Treatment with one or more electron donors may precede, be simultaneous with, or follow reaction with the halogenating agent. It is crucial to the practice of this invention that reaction with the halogenating agent take place initially while the progenitors of the eventual support, the mixed metal alkoxide and liquid compound, are in the liquid state.

The halogenating agent functions to transform the solubilized metal alkoxide to an insoluble metal halide support. The conversion from metal alkoxide to metal halide may be partial or complete. The preferred supports, thus formed in situ, are magnesium halide or manganese halide. The preferred halogenating agents and the preferred halides are chloride. Bromide is a lesser preferred halide.

Halogenating agents are those compounds which can cause replacement of an alkoxide group by a halogen. Group III, Group IV, and Group V halides may be employed, as may hydrogen halides, or the halogens themselves. Specific examples of the preferred chlorinating agents are $BCl_3$, $AlCl_3$, $CCl_4$, $SiCl_4$, $TiCl_4$, $ZrCl_4$, $VOCl_2$, $CrOCl_2$, $SbCl_5$, $POCl_2$, $PCl_5$, and $HfCl_4$. Preferred halogenating agents are $TiCl_4$ and $SiCl_4$.

The amount of halogenating agent employed may range from about 2 to about 25 equivalents per equivalent of metal alkoxide. The preferred ratio is about 4 to about 10 equivalents halogenating agent per equivalent of metal alkoxide. The halogenating agent may be added neat to the liquid in incremental fashion, if it is itself a liquid, or it may be added as a solution. The preferred solvent for the halogenating agent is the same solvent/thinner employed in contacting step (a), e.g., toluene.

The halogenation step may be carried out at a temperature of from about 0° C. to about 200° C. depending upon the halogenation agent chosen and the chemical ratio of halogenating agent to solubilized metal alkoxide. For the preferred $TiCl_4$ or $SiCl_4$, a temperature range from about 80° to about 140° C. is preferred. The reaction time may vary from about one-half to about eight hours depending on the halogenating agent, the temperature, and the concentration. The preferred reaction is from about one to about three hours.

During halogenation a solid precipitate forms. This solid may be treated with one or more electron donors during or after its formation. Treatment with one or more electron donors may be carried out as a separate step after separation, washing, and vacuum-drying the solid or concurrent with the halogenation reaction. To avoid side reactions the halogenating agent is normally added gradually over several minutes to a half-hour in time, but the electron donor is generally added to the system all at once.

Electron donors, also known as Lewis bases, are organic compounds of oxygen, nitrogen, phosphorus, or sulfur which can donate an electron pair to the catalyst support or a compound combined with the catalyst support. Electron donors can be either reactive or non-reactive types of compounds. Some reactive types of electron donors are organic acids, phenols, carboxylic esters, acid chlorides, alcohols or amines. Some non-reactive types of donors are ethers, polysiloxanes (silicone oil), thioethers, or nitriles.

Among the classes of compounds containing oxygen suitable for furnishing electron-donors are: aliphatic and aromatic ethers, aliphatic carboxylic esters, aromatic carboxylic esters, cyclic esters of carbonic acid, alcohols, aldehydes, ketones, aliphatic and aromatic carboxylic acids, lactones, and carboxylic acyl halides.

Among the classes of compounds containing nitrogen suitable for furnishing electron-donors are: aliphatic amines and polyamines, aromatic amines, heterocyclic amines, nitriles, carbamates, aromatic isocyanates, and aromatic azo compounds. Electron-donors containing both oxygen and nitrogen atoms may be used such as aliphatic and aromatic amides, nitro compounds, or guanidine and its alkyl-substituted derivatives.

Other classes of electron-donors include phosphines, phosphoroamides, sulfides, mercaptans, thioethers, thioesters, organosilicon isocyanates, and polysilazines.

Examples of electron-donor compounds from some of the classes listed above are: ethyl benzoate, ethyl anisate, ethyl toluate, ethyl acetate, diethyl carbonate, γ-butyrolactone, acetone, acetophenone, nitrobenzene, veratrol, tetramethylenediamine, dimethyl acetamide methyl carbamate, toluene diisocyanate, benzonitrile, N-methyl pyrrolidone, and thiophenol. Preferred donors are aromatic carboxylic esters, phenols, and polysiloxanes. Especially preferred among these electron-donors is ethyl benzoate.

The treatment with an electron donor is preferably carried out at an elevated temperature, such as from about 50° to about 220° C. It is often advantageous to carry out the reaction in an inert solvent such as a hydrocarbon or a halogenated hydrocarbon. It is convenient to carry out the reaction with the electron donor at reflux if the electron donor is a liquid or if a liquid inert solvent is employed, especially if the reflux temperature is at 80° C. or higher. For the preferred ethyl benzoate the reflux temperature is about 210° C. Two or more electron donors may be employed concurrently or sequentially.

Depending inversely on the temperature of the treatment with the electron donor, the preferred time ranges from about one to about eight hours. A more preferred reaction time for this step of treatment with an electron donor is about three to four hours.

After halogenation of the liquid mixture to form a solid support and treatment of the solid so formed with one or more electron donors, it is advantageous to separate the solid from the reaction/treatment mixture, wash it one or more times with an inert volatile solvent, such as heptane, and vacuum-dry it. If certain transition metal halides have been employed in step (b) as the halogenation agent, e.g., $TiCl_4$, then even at this point the separated, washed, dried solid has some catalytic properties. Further steps will, however, vastly enhance the catalytic characteristics of the treated support.

Once the catalytic support is formed and treated, it is sensitive to moisture. Therefore, it should be kept and handled in an inert atmosphere thereafter. Dry nitrogen or argon are examples of inert gases. Use of a gloved dry box is convenient for handling and storage of the catalytic intermediates.

The third and final step, (c), in the preparation of the novel, supported catalytic component of the present invention is post-treatment with a fluid comprising a transition metal halide. Titanium is the preferred transition metal, and titanium tetrahalide, neat or in a solution of an inert organic solvent, is the preferred halide. Examples of inert solvents are heptane, toluene, chlorobenzene, and kerosene.

The preferred transition metals to be bound onto the catalyst support are titanium, vanadium, and zirconium, but other metals from Groups IVB and VB of the periodic table may be employed. Any liquid or gaseous compound containing at least one transition metal-halogen bond may be used to bind the transition metal ion to the treated, catalyst support. Chlorine is the preferred halogen, but compounds of bromine or iodine may also be used. Liquid compounds containing transition metal-halogen bonds are preferred to gases. Solid compounds may be employed, if they are soluble in inert solvents.

Examples of preferred specific titanium halide compounds which may be used are: $TiCl_4$, $TiBr_4$, $TiI_4$, $Ti(OC_3H_7)Cl_3$, $Ti(OC_6H_5)Cl_3$, $Ti(OC_4H_9)SCl_2$, $Ti[OC(CH_3)=CHCOCH_3]Cl_2$, $Ti[N(C_2H_5)_2]Cl_3$, and $Ti(C_6H_5COO)Cl_3$. Analogous halogen-metal compounds of V, Zr, and niobium may also be employed.

The amount of transition metal-halide fluid compound used ranges from about 0.1 mole to about 2 moles per mole magnesium in the support material, when the transition metal halide is dissolved in an inert solvent. When the transition metal halide is employed as a liquid, neat, or in the form of a gaseous stream then it will normally be in large stoichiometric excess.

The temperature of post-treatment for the intermediary solid resulting from step (b) with the transition metal halide in step (c) ranges from about ambient temperature to about 180° C. The preferred range is from about 80° C. to about 137° C., the boiling point of $TiCl_4$ at atmospheric pressure.

The time of post-treatment step (c) varies inversely with temperature from about one hour to about eight hours. From about two to about three hours post-treatment time is preferred.

Normally after the post-treatment has been completed the catalyst is filtered, washed one or more times with the solvent of the reaction, if one has been used, and then several times with a volatile solvent such as heptane before drying under reduced pressure. It is advantageous to wash the separated catalyst with enough solvent so that the filtrate is free of halogen before vacuum drying.

After preparation the catalyst of the present invention should be kept and handled in a dry, inert atmosphere, such as nitrogen, before use.

The product of the present invention will normally contain from about one percent to about ten percent by weight of transition metal.

The catalytic component of the present invention is broadly applicable to the polymerization of monomeric olefins including 1-olefins such as ethylene and propylene, dienes, especially conjugated dienes such as butadiene, and those other olefins which are only polymerized with difficulty, such as 2-butene. The preferred monomeric olefins are those corresponding to the formula $R-CH=CH_2$, wherein R is an alkyl radical containing up to 12 carbon atoms inclusive and hydrogen. Among the preferred monomeric olefins are ethylene, propylene, 1-butene, 1,4-butadiene, 1-pentene, 4-methyl-1-pentene, 1-hexene, and the like. These monomers may be employed individually or in comonomeric mixtures such as ethylene/propylene, ethylene/propylene/butadiene, and the like. The term "monomeric olefin" means those olefins which can undergo addition polymerization alone or with comonomers.

Although for illustrating the present invention, the polymerization of propylene is described herein as an example, the invention is by no means limited to any one monomeric olefin.

The organometallic compound for the necessary cocatalyst, may be an organometallic compound known to those skilled in the art of coordinate complex polymerization as useful. Included are organocompounds of zinc, mercury, magnesium, cadmium, boron, gallium and other metals of Groups IA, IIA, and IIIA of the periodic table of elements. The preferred organometallic compounds are those of aluminum, especially trialkyluminums.

The molar ratio of trialkyl aluminum or other cocatalyst to the novel catalyst of the present invention may range from about 1000:1 to about 1:1, preferably about 200:1 to about 10:1.

An electron donor may be employed in the cocatalyst component with the organometallic compound. Oxygen compounds are preferred donors especially alkyl esters of aromatic carboxylic esters. Methyl toluate, ethyl anisate, ethyl benzoate, and dibutyl phthalate, are examples of such preferred electron donors (Lewis bases) for the cocatalyst component.

The electron donor employed in conjunction with the cocatalyst may be advantageously used in a molar ratio from about 1:15 to about 1:1 with respect to the cocatalyst (e.g., trialkylaluminum).

After having described the preparation of the novel polymerization catalyst of the present invention above, the following Examples illustrate but do not limit its utility. Many variations of these Examples can be carried out by those skilled in the art of coordination complex polymerization within the scope of this invention.

EXAMPLE 1

This Example illustrates the preparation of the catalytic component of the present invention.

In a 250-ml, stirred, jacketed, reaction flask, 5.0 g magnesium ethoxide and 20 ml tetrabutyl orthotitanate were stirred with heating at 135° C. for 1.5 hours. Then 50 ml toluene were slowly added and the liquid filtered to produce a clear, yellow filtrate.

In another reaction flask the filtrate was stirred as 55 ml titanium tetrachloride ($TiCl_4$) was slowly added over 10 minutes. During the subsequent two hours of reaction at 115° C. a solid formed. After five minutes of partial cooling, the reaction mixture was filtered warm, washed once with toluene, four times with heptane (100 ml), and vacuum-dried to produce 4.3 g of a chartreuse-colored solid.

The halogenated solid was then treated at reflux with 50 ml heptane containing 2 ml ethyl benzoate, cooled for one-half hour, filtered, washed five times with 50-ml portions of heptane, and vacuum dried to yield a pale yellow product, weighing 4.5 g.

The treated solid was then post-treated with 50 ml neat $TiCl_4$ at 105°–110° C. for two hours, filtered hot, washed with 30 ml $TiCl_4$, four times with 75-ml portions of heptane, and vacuum dried to yield a gray-green catalyst weighing 2.3 g.

EXAMPLE 2

This Example illustrates the use of the catalytic component of the present invention to polymerize propylene by the slurry method.

The novel component containing titanium is air and moisture sensitive. Thus during preparation, storage, and use it should be kept in an inert atmosphere (e.g., nitrogen, argon) containing less than 5 ppm oxygen and less than 5 ppm moisture. The preferred cocatalysts methyl toluate or ethyl anisate are hydroscopic and should also be handled in a moisture-free environment. All reagents should be of polymerization grade.

Into a 4.5 L. stirred reactor equipped with a heater, means for temperature control, gas inlet and outlet lines are added in order 2 L. heptane, 12 mmole triethylaluminum, 0.54 g of methyl p-toluate, 100 mg of the novel catalyst prepared in Example 1, and 3.2 psi (1/5 atmosphere) of hydrogen as a polymerization moderator. The reactor is stirred at 600 rpm, held at 65° C. Then the monomer-grade propylene is introduced and maintained at 10 atm. (total) for 1.5 hours, whereupon this polymerization is stopped by venting the gases and pouring the contents of the reactor into alcohol. Filtering and vacuum-drying steps are carried out in the usual manner.

Catalytic activity is defined as the grams of total polymer produced both soluble and insoluble in the polymerization medium per gram of catalytic component. For the catalytic component of Example 1 the activity was 3990 g PP per gram catalyst.

Isotactic Index (II) is defined as the weight percent of the total polymer produced which is soluble in refluxing heptane after three hours. For the polymer made by the catalyst of Example 1 the II was 82 percent.

COMPARATIVE EXAMPLE 1

This Comparative Example illustrates preparation of a catalyst by solid state halogenation rather than the liquid phase step (a) of the present invention.

A catalytic component was prepared by the general procedure of Example 1 with the following differences:

(a) no heating in titanium tetrabutoxide was employed, hence no solubilization;

(b) there was no filtration in step (a) since no solution was formed;

(c) the 5 g magnesium ethoxide was directly halogenated by 55 ml neat $TiCl_4$ at 115° C. for two hours.

Following the procedure of Example 2, a characterizing slurry polymerization of propylene was carried out. The catalytic activity of this sample was found to be 3,563 g PP/g catalyst. The isotactic index of the polypropylene (PP) formed was 88.3 percent.

COMPARATIVE EXAMPLE 2

This Comparative Example illustrates formation of typical polypropylene by means of a typical milled catalyst supported on $MgCl_2$ in order to make a sample for comparison in Example 3 of particle size distribution of various polymers.

By the general procedure of our disclosure in U.S. patent application Ser. No. 405,977, now U.S. Pat. No. 4,450,242 a milled catalytic component of the supported $MgCl_2$ type was prepared.

By the procedure of Example 2 a slurry polymerization of propylene was carried out to characterize this milled, supported, catalytic component. The catalytic activity was found to be 9,500 PP/g catalyst, and the isotactic index was 83.7 percent.

EXAMPLE 3

This Example illustrates the advantages of the present invention in preparing a catalyst leading to stereospecific polymer of narrower distribution of larger-sized particles compared to ordinary catalytic components.

The polypropylenes prepared in Example 1, Comparative Example 1, and Comparative Example 2 were wet-sieved in ethanol by the procedure of ASTM STP 447A (1972) to give the distribution of their particle size, by weight. The results are given in the following Table.

TABLE

| Size (μm) | Particle Size Distribution Weight Percent | | |
|---|---|---|---|
| | Expl. 1 | Comp. Expl. 1 | Comp. Expl. 2 |
| <45 | 1.21 | 0.33 | 4 |
| 46-75 | 1.21 | 0.85 | 3 |
| 76-180 | 0.2 | 6.4 | 12 |
| 181-425 | 10 | 26.8 | 23 |
| 426-850 | 23.2 | 49.4 | 27 |
| 851-1700 | 48.3 | 16.0 | 29 |
| >1700 | 15.9 | 0.10 | 2 |

It is seen that the polypropylene prepared from the catalytic component of the present invention has a sharper distribution at a larger particle size than polymers made by methods other than those of the present invention. The polypropylene from the milled catalyst of Comparative Example 2 has a particularly large percentage of "fines".

EXAMPLE 4

This Example illustrates treatment with a multiplicity of electron donors concurrent with formation of the solid support from its liquid progenitors.

In a stirred, jacketed 250-ml reaction flask 5.8 g magnesium ethoxide and 20 ml. titanium tetrabutoxide were heated at 145° C. for 2.5 hours. Then 50 ml toluene solvent/thinner was added and the cooled solution filtered. The clean yellow filtrate was added to a reaction flask containing 2 ml ethyl benzoate, 2.1 g phenol, and 2 ml silicone oil (General Electric Co. SF 95-100).

To the above mixture was added dropwise over 25 minutes 55 ml TiCl$_4$. The reaction was carried out at 105° C. for two hours to give a treated, solid suspension, which was cooled five minutes, filtered, washed four times with 50-ml portions of heptane, and vacuum-dried to give 4.4 g of a brown treated solid.

A 3-g aliquot of the brown solid was treated, with stirring, with 10 ml neat TiCl$_4$ at 105° C. for two hours, cooled 30 minutes, filtered, washed four times with heptane and vacuum dried to give 2.6 g of a tan-colored catalytic component.

By the procedure of Example 2 this catalyst was tested three times in the slurry polymerization of propylene. The catalytic activity averaged 6,785 g PP/g catalyst. The isotactic index of the polymer averaged 87 percent.

By the method of ASTM STP 447A, wet-sieving in ethanol, the particle size distribution of the dried polypropylene particles was determined with the following results:

| Particle Size (μm) | Percent by wgt. |
|---|---|
| 45 | 0.4 |
| 45-75 | 0.6 |
| 75-180 | 3.3 |
| 180-425 | 12.4 |
| 425-850 | 31.7 |
| 850-1700 | 33.0 |
| >1700 | 18.6 |

It is seen that the fines (<180 μm) total only 4.3 weight percent.

COMPARATIVE EXAMPLE 3

This Comparative Example illustrates the result of omitting step (c), the post-treatment with the transition metal halide.

The procedure of Example 4 was employed except that the brown treated solid prepared in paragraph 3 of Example 4 was employed as the catalyst in the characterizing slurry polymerization of Example 2, i.e., post-treatment step (c) with TiCl$_4$ was omitted.

The catalytic activity of the brown treated solid from Example 4 was 4,760 g PP/g catalyst. The isotactic index of the polypropylene produced was 84.1 percent.

Since the key step (a) of the present invention, halogenation of a liquid phase, was employed, however, the particle size distribution was excellent as shown by the results below. Only 2.95 weight percent of the particles had a diameter less than 180 μm.

| Particle size (μm) | less than 45 | 45-75 | 75-180 | 180-425 | 425-850 | 850-1700 | >1700 |
|---|---|---|---|---|---|---|---|
| Percent by wt. | 0.71 | 0.41 | 1.83 | 4.16 | 14.71 | 46.86 | 31.34 |
| Cumulative wt. percent | 0.71 | 1.12 | 2.95 | 7.11 | 21.82 | 68.68 | 100 |

COMPARATIVE EXAMPLE 4

This Comparative Example illustrates the result of omitting the use of one of the three electron donors of Example 4.

A catalyst was prepared as in Example 4, except that no silicone oil was employed with the ethyl benzoate and phenol electron donors.

The catalytic activity of the catalyst prepared without the use of the silicone oil as an electron donor was 6678 g PP/g catalyst; the isotactic index of the polypropylene was 84.7 percent.

Since the key step (a) of the present invention, halogenation of a liquid phase, was employed, however, the particle size distribution was excellent as shown by the results below. The weight percent of polymer particles below 180 μm was 2.04.

| Particle Size (μm) | less than 45 | 45-75 | 75-180 | 180-425 | 425-850 | 850-1700 | >1.7 mm |
|---|---|---|---|---|---|---|---|
| Percent by weight | 0.20 | 0.41 | 1.43 | 3.37 | 5.01 | 7.76 | 81.82 |
| Cumulative wt. percent | 0.20 | 0.61 | 2.04 | 5.41 | 10.42 | 81.18 | 100 |

COMPARATIVE EXAMPLE 5

This Comparative Example illustrates the results of failing to solubilize the magnesium ethoxide slurry initially.

In a stirred jacketed 250-ml reaction flask 5.8 g magnesium ethoxide was heated in 50 ml of toluene at 145° C. for 2.5 hours to yield a suspension which was not filtered.

The three electron donors were then added as in Example 4 and the remainder of the process steps were carried out as in Example 4 to yield 2.7 g of tan-colored solid catalyst.

This control catalyst showed an average activity of 7024 g PP/g catalyst; the polypropylene produced had an average isotactic index of 85.5 percent.

The particle size distribution of the polymer particles by wet sieving in ethanol (ASTM STP 447A, 1972) is given below. The "fines" given by the weight percent of particles smaller than 180 μm was 17.5.

| Particle Size (μm) | less than 45 | 45–75 | 75–180 | 180–425 | 425–850 | 850–1700 | >1.7 mm |
|---|---|---|---|---|---|---|---|
| Percent by weight | 2.87 | 2.87 | 11.77 | 14.33 | 47.19 | 13.0 | 7.98 |
| Cumulative | 2.87 | 5.74 | 17.51 | 31.84 | 79.17 | 92.17 | 100 |

I claim:

1. A catalytic component for polymerizing olefins comprising a solid support containing magnesium-halogen and/or manganese-halogen bonds, a transition metal halide of a metal selected from Groups IVB and VB of the periodic table, and electron donors obtained by steps comprising:
    (a) contacting a Mg(OR)$_2$ and/or Mn(OR)$_2$ compound with a Ti(OR)$_4$ compound to comprise a liquid, where R is a hydrocarbyl or halogenated hydrocarbyl moiety containing 1 to 20 carbon atoms or a halogen,
    (b) reacting the liquid with a fluid comprising a halogenating agent and treatment with an electron donor to form a treated solid, and
    (c) post-treating the solid with a transition metal halide.

2. A catalytic component as in claim 1 wherein the transition metal is titanium.

3. A catalytic component as in claim 1 wherein the electron donor comprises a carboxylic ester.

4. A catalytic component as in claim 1 wherein the halides are chlorides and the halogenating agent comprises chlorine atoms.

5. A catalytic component as in claim 1 wherein reaction step (b) is carried out with the halogenating agent and the electron donor sequentially.

6. A catalytic component as in claim 1 wherein reaction step (b) is carried out with the halogenating agent and the electron donor simultaneously.

7. A catalytic component as in claim 1 wherein the halogenating agent is selected from the group of compounds consisting of transition metal halides selected from Groups IVB and VB of the periodic table, halogens, and hydrohalogens.

8. A catalytic component as in claim 7 wherein the halogenating agent is titanium tetrachloride.

9. A catalytic component as in claim 1 wherein the electron donor comprises ethyl benzoate.

10. A catalytic component as in claim 1 wherein the Mg(OR)$_2$ compound is magnesium ethoxide.

11. A catalytic component as in claim 1 wherein the Ti(OR)$_4$ compound is tetrabutyl titanate.

12. A catalytic component as in claim 1 wherein the magnesium-halide bond is a magnesium chloride bond.

13. A catalytic component as in claim 1 wherein the transition metal halide is titanium tetrachloride.

14. A process for preparing a catalyst for polymerizing olefins comprising the steps of:
    (a) contacting a Mg(OR)$_2$ and/or Mn(OR)$_2$ compound with a Ti(OR)$_4$ compound to comprise a liquid, where R is a hydrocarbyl or halogenated hydrocarbyl moiety containing 1 to 20 carbon atoms or a halogen.
    (b) reacting the liquid with a fluid comprising a halogenating agent and treatment with an electron donor to form a treated solid, and
    (c) post-treating the solid with a transition metal halide.

15. A process as in claim 14 wherein the transition metal is titanium.

16. A process as in claim 14 wherein the electron donor comprises a carboxylic ester.

17. A process as in claim 14 wherein the halides are chlorides and the halogenating agent comprises chlorine atoms.

18. A process as in claim 14 wherein reaction step (b) is carried out with the halogenating agent and the electron donor either sequentially or simultaneously.

19. A process as in claim 14 wherein the halogenating agent and the transition metal halide are titanium tetrachloride, the Mg(OR)$_2$ compound is magnesium ethoxide, the Ti(OR)$_4$ compound is titanium tetrabutoxide, and the electron donor is ethyl benzoate.

* * * * *